Jan. 28, 1941.  A. F. CONKLIN  2,230,051
ATTACHMENT FOR HEATERS
Filed April 27, 1939
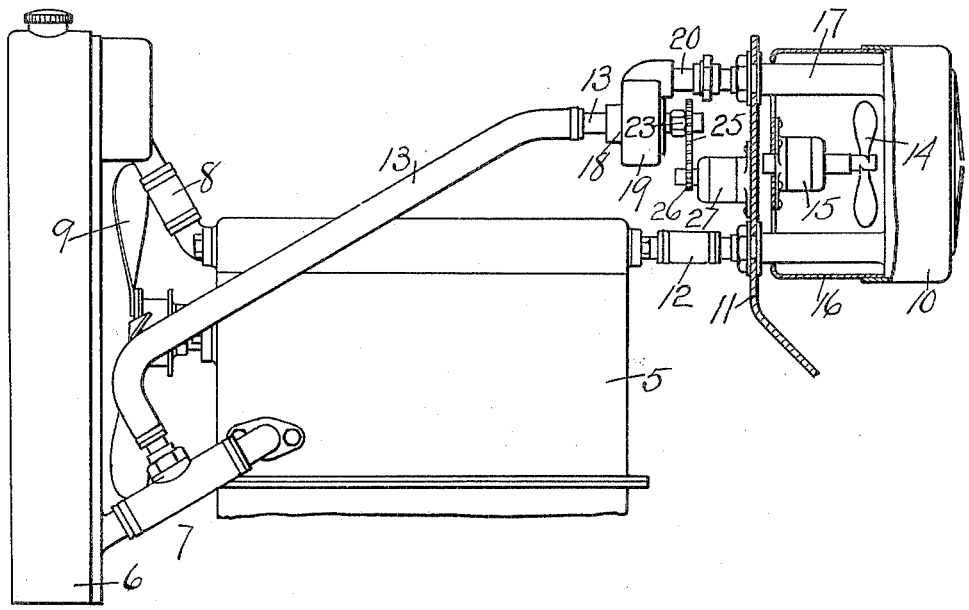
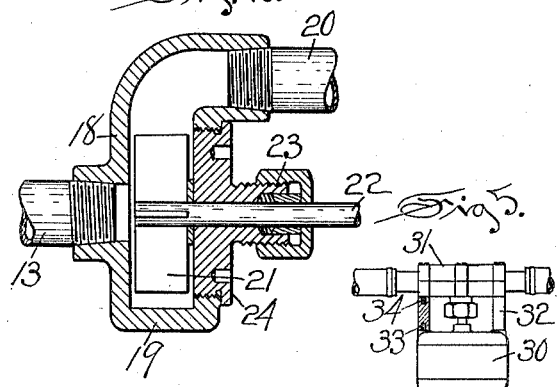
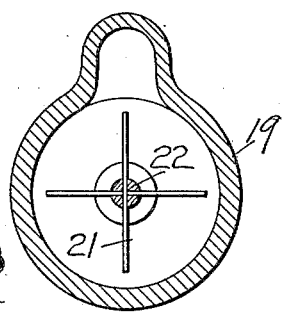
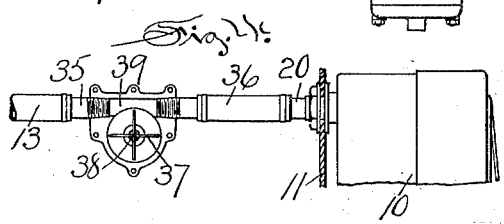
INVENTOR
Alveston F. Conklin
by
Arthur B. Jenkins
ATTORNEY Patented Jan. 28, 1941

2,230,051

UNITED STATES PATENT OFFICE 2,230,051

ATTACHMENT FOR HEATERS

Alveston F. Conklin, Wallingford, Conn., assignor of one-third to John M. MacFarlane, New Britain, Conn., and one-third to John J. Kane, Simsbury, Conn.

Application April 27, 1939, Serial No. 270,430

1 Claim. (Cl. 237—12.3)

My invention relates to the class of heaters which are particularly adapted for use in automobiles, and an object of my invention, among others, is the production of an attachment for a heater in which the heating effects may be continued after the engine has ceased to operate and by the use of apparatus that may be economically operated without undue drain upon the electrical equipment of the vehicle; and a further object of the invention is the production of an attachment that may be readily incorporated in automobiles now in use without the substitution of any parts or material change in the regular equipment of such automobile.

One form of an attachment for a heater embodying my invention, and in the construction and use of which the objects herein set out, as well as others, may be attained, is illustrated in the accompanying drawing, in which—

Figure 1 is a side view of an automobile engine and radiator showing my improved attachment for a heater connected therewith.

Figure 2 is a detail view on enlarged scale in central section through the auxiliary circulating pump.

Figure 3 is a view in cross section through the same.

Figure 4 is a side view, with parts broken away, illustrating a little different arrangement of the pump connection, the scale being reduced.

Figure 5 is a top view of the same.

While my invention is illustrated herein in connection with heaters more particularly employed for heating the interiors of automobiles, yet, I do not contemplate that the invention shall be limited to such a heater.

In many of the automobile heaters employed at the present time in which the regular circulating pump for the cooling system is employed to circulate water through the heater, when the engine is stopped the circulation ceases and operation of the heater is therefore terminated. It is the purpose of my invention to provide means for attachment to cars now in use whereby the heating system may be continued in use after the engine is stopped, but which means shall be put into use only when operation of the regular circulatory system of the car ceases to operate, such a device being shown in the drawing herein in which the numeral 5 denotes an automobile engine, 6 a radiator of the cooling system, 7 a tube between the engine case and the bottom of the radiator, 8 a tube between the top of the radiator and the top of the engine case and 9 the fan for circulating air through the radiator 6.

The numeral 10 denotes a heater mounted inside of the cowl 11 of the automobile. A connection 12 from the heater 10 to the engine case and a connection 13 from the lower part of the engine case, herein shown as connected with the tube 7, is employed for circulating water through the heater 10. In prior devices this connection 13 has been directly with the heater 10 and a fan 14 has been employed to circulate air through the heater and within the automobile, the fan 14 being driven as by means of a motor 15 located within the heater case 16 and supplied with current as from the regular electric system of the automobile. All of the parts thus far described are of old and well known construction and further and detailed description is therefore omitted herein.

In adapting my invention for the purpose hereinbefore set out I provide an auxiliary pump so connected with the circulatory system for the heater that the circulation through the heating system may be continued after the engine stops. In the particular arrangement herein shown an extension 17 leads from the connection 13 to the heater 10 and in this connection I place an auxiliary pump 18 for the purpose of circulating hot water through the heater 10. The construction and operation of this pump is immaterial. The particular form herein shown comprises a case 19 into which the connection 13 is threaded at about the vertical center thereof and as shown in Fig. 2. A nipple 20 is threaded into the upper part of the case and is suitably connected with the extension 17 by unions adapting it to be secured to the cowl 11.

The auxiliary pump comprises blades 21 secured to a pump shaft 22 extending through a stuffing box 23 in a cap 24 secured to the side of the case 19 to close the chamber therein and as shown in Fig. 2. The shaft 22 has a gear 25 secured thereto meshing with a gear 26 on the shaft of a motor 27 secured to the cowl or instrument board 11. The motor is connected with the electrical equipment of the car and suitable means, as a switch on the instrument board, will enable the operation of the motor to be controlled. In the operation of the device when the engine of the car is running circulation of the heating medium through the heater 10 will take place in the ordinary manner. When, however, the engine is stopped the circulation of this heating medium ceases. This is when my improvement comes into play. At such time the switch on the instrument board being operated the motor 27 will be started and this will set the pump 19 into operation to promote circulation of the heating medium into the heater 10. It will be noted that the pump 19 is of such character that, when the motor 27 is not operating, the water will be circulated through the pump in the ordinary manner, but without operation of the blades 21 therein.

An important feature of my invention and I might say the preferred form of the attachment is illustrated in Figs. 4 and 5 on reduced scale, this attachment embodying means whereby it may be installed in cars in common use at the present time with little trouble and without material change in existing parts. In this form of the device the motor 30 and the pump 31 are combined in one unit. The motor is attached to the pump by means of supports 32 each of which has screw threaded sockets in its opposite ends fitting the projecting ends of the screw threaded bolts 33 and 34 extending through the motor and pump structures, respectively, and serving to secure the parts of said structures together and as shown in Fig. 5. Nipples 35 project from opposite sides of the pump 31, the hose or tube 13 being secured to one of said nipples and a section of rubber tube 36 being attached to the other of said nipples and also to the nipple 20 shown on the other form of the invention. In this structure fan blades 37 on the shaft 38 project with their ends into a passage 39 through the pump. In this form of the device, as in that hereinbefore described, circulation of the heating medium through the pump will take place when the engine is running and when the motor for the pump is stationary, thereby, as in the other case, requiring operation of the pump only when the engine of the automobile is not in operation.

This provides means whereby when the engine is running circulation of the heating medium is provided in the ordinary manner but when the engine stops then the pump 19 is brought into play to effect such circulation. This operation of the pump 19 and the motor 27 is not required when the engine is running and therefore a drain on the electrical system does not needlessly take place such as would be the case if the motor 27 and the pump 19 operated simultaneously with the operation of the engine.

While the specific connection between the motor spindle and the pump shaft has not been shown herein, it will be understood that they may be operatively connected in any suitable manner common to structures of this class.

I claim:

The combination with the cooling system of an internal combustion engine of an automobile vehicle, a vehicle heater, conduits connecting the vehicle heater to said cooling system whereby circulation through the vehicle heater is obtained when the engine is active, a centrifugal type pump located in one of said conduits, said pump adapted to permit free circulation through itself when the engine is active and the pump inactive, and means including a motor and control means therefor to permit actuation of said pump when the internal combustion engine is inactive.

ALVESTON F. CONKLIN.